United States Patent
Yamaguchi et al.

(10) Patent No.: US 8,019,481 B2
(45) Date of Patent: Sep. 13, 2011

(54) FLOW RATE RATIO CONTROL DEVICE

(75) Inventors: Yuji Yamaguchi, Kyoto (JP); Akihiro Matsumoto, Uji (JP); Yutaka Yoneda, Otsu (JP)

(73) Assignee: Horiba STEC, Co., Ltd., Kyoto (JP)

( * ) Notice: Subject to any disclaimer, the term of this patent is extended or adjusted under 35 U.S.C. 154(b) by 278 days.

(21) Appl. No.: 12/518,875

(22) PCT Filed: Dec. 11, 2007

(86) PCT No.: PCT/JP2007/073834
§ 371 (c)(1),
(2), (4) Date: Jun. 11, 2009

(87) PCT Pub. No.: WO2008/072614
PCT Pub. Date: Jun. 19, 2008

(65) Prior Publication Data
US 2010/0030390 A1    Feb. 4, 2010

(30) Foreign Application Priority Data
Dec. 12, 2006  (JP) .................................. 2006-335119

(51) Int. Cl.
*G05D 11/02* (2006.01)
*G05D 11/13* (2006.01)

(52) U.S. Cl. ......... 700/282; 137/9; 137/487.5; 137/486; 137/870

(58) Field of Classification Search ............... 700/282, 700/285, 12, 19, 68; 137/459, 485, 486, 137/487.5, 9, 599.07, 870
See application file for complete search history.

(56) References Cited

U.S. PATENT DOCUMENTS

2003/0130807 A1* 7/2003 Ambrosina et al. ............ 702/45
2005/0005994 A1* 1/2005 Sugiyama et al. ................ 141/4

FOREIGN PATENT DOCUMENTS

| JP | 48-014986 A | 2/1973 |
| JP | 01-201708 A | 8/1989 |
| JP | 06-259143 | 9/1994 |
| JP | 2005-038239 | 2/2005 |

OTHER PUBLICATIONS

ISA/Japanese Patent Office, International Search Report of PCT/JP2007/073834, Mar. 25, 2008, 2 pages, Japan.

* cited by examiner

*Primary Examiner* — Albert Decady
*Assistant Examiner* — Steven R Garland
(74) *Attorney, Agent, or Firm* — Alleman Hall McCoy Russell & Tuttle LLP

(57) ABSTRACT

A flow ratio controller having: a main channel; branch channels branching from the end of the main channel; control valves respectively provided in the branch channels; a plurality of flow rate meters for measuring the flow rate of the main channel and the flow rate of each of the branch channels; a valve control section for controlling the control valve provided in one branch channel so that the pressure on the upstream side of the control valve is a given target pressure and, only when the upstream-side pressure is near or not less than the target pressure, starting control of the other control valve so that the flow rate ratios of the branch channels are predetermined ratios; and a target pressure setting section for setting the target pressure such that the smaller the flow volume is in the main channel, the lower is the target pressure.

3 Claims, 6 Drawing Sheets

FLOW RATE RATIO CONTROL DEVICE

BACKGROUND OF THE INVENTION

1. Field of the Invention

The present invention relates to flow rate ratio controllers, used in semiconductor manufacturing processes, which branch at a desired ratio a flow of source gases.

2. Description of the Background Art

In the field of the semiconductor manufacturing process in recent years, along with an increase in wafer size, the size of the processing chambers containing the wafers has also been increased. Meanwhile, when films are deposited on semiconductor wafers, the source gases for the deposition preferably have a uniform concentration; however, if the source gases are introduced into one of these larger-sized processing chambers through only one location, the concentration distribution may become partially unbalanced.

For this reason, more recently, processing chambers have been adapted so as to incorporate a plurality of gas inlets, and fed through the respective inlets with source gases at a mass flow ratio that is controlled such that the gas concentration in the chamber is made uniform. In this case, as a device for branching the flow of the source gases at a desired ratio, a flow rate control device is used.

FIG. 5 illustrates an example of a conventional flow rate ratio control device 100X of a two-branch-flow type. In FIG. 5, reference symbol RXM represents a main channel into which gas flows. The main channel RXM is provided with a pressure sensor 4X, and an end thereof is branched into two. In the branched branch channels RX1 and RX2, flow rate meters 21X and 22X, and control valves 31X and 32X are respectively provided in series. Also, a valve control section 5X monitors units of flow rate data outputted from the respective flow rate meters 21X and 22X, and pressure data outputted from the pressure sensor, and on the basis of values from the respective units of data, controls the control valves 31X and 32X such that ratios of mass flow rates of gas flowing through the respective branch channels RX1 and RX2 to the total flow rate (referred to as flow ratios) become equal to given predetermined ratios.

Specifically, the valve control section 5X firstly performs feedback control of the control valve 31X in one of the branch channels RX1 such that the value from the above-described pressure data (also referred to as measured pressure) becomes equal to a predetermined constant target pressure. Then, under the condition that the measured pressure is controlled to be near or not less than the target pressure, the valve control section 5X performs feedback control of the other control valve 32X such that the ratios of the values of the units of flow rate data (measured flow rates) to the total flow rate become equal to the predetermined ratios.

Patent document 1: Japanese Unexamined Patent Publication No. 2005-38239

SUMMARY OF THE INVENTION

However, a problem with such devices is that in a state where the flow rate through the main flow channel RXM is small, the response becomes poor, and therefore transient performance of the branch flow control becomes unstable.

The reason is specifically described by taking an example. When for example flow-channel switching is performed, in which the base of the main channel RXM is also connected to another channel, and as a result a pressure drop occurs along with a decrease in the flow rate through the main channel RXM, the control valve 31X in the one branch channel RX1 is first closed in order to raise the pressure. However, because of the low flow rate, the pressure only gradually rises, and therefore it takes time to reach the target pressure. Meanwhile, the other control valve 32X is also brought into a closed state, wherein the valve 32X is not being controlled. As described, once the pressure is reduced, operations of the respective valves are stopped for a rather long period of time, during which branch flow control is not performed. FIG. 6 illustrates a corresponding experimental result. It turns out that once the pressure has dropped (at time TS), in a state where the flow rate is low, it takes a considerable period of time (t1) until the pressure is recovered, during which interval the control is unstable.

That is, as described above, if the flow rate through the main channel is decreased, the device response becomes poor, and therefore performance of branch flow control in the transient situation is deteriorated.

The present invention is made in consideration of such problems, and has a desired object to maintain, without changing physical configuration in this sort of flow rate ratio control device, the response and to secure the transient performance of branch flow control even in the state where the flow rate through the main channel is low.

In order to solve such problem, the present invention takes following means.

That is, the present invention relates to a flow rate ratio control device including: a main channel into which fluid flows; a plurality of branch channels branching from an end of the main channel; control valves that are respectively provided in the branch channels, and adjust flow rates through the branch channels; flow rate measuring means adapted to directly or indirectly measure a flow rate through the main channel and flow rates through the respective branch channels; a valve control section adapted to control one of the control valves provided in one of the branch channels so as to make a pressure on an upstream side of the one control valve equal to a given target pressure, and upon the pressure exceeding a vicinity of the target pressure, start to control other of the control valves so as to make flow rate ratios of the respective branch channels equal to predetermined ratios; and a target pressure setting section adapted to set the target pressure lower as the flow rate through the main channel decreases, and output the target pressure to the valve control section.

In the performance of ratio control, the preferred number of the branch channels is two.

Also the present invention relates to a control mechanism applied to a fluid circuit mechanism including a main channel into which fluid flows, a plurality of branch channels branching from an end of the main channel, control valves that are respectively provided in the branch channels and adjust flow rates through the branch channels, flow rate measuring means adapted to directly or indirectly measure a flow rate through the main channel and the flow rates through the respective branch channels, and a pressure sensor provided on an upstream side of one of the control valves in one of the branch channels, in which the control mechanism includes: a valve control section adapted to control the one control valve provided in the one branch channel to make a pressure on the upstream side of the one control valve equal to a given target pressure, and upon the pressure exceeding a vicinity of the target pressure, start to control other of the control valves so as to make flow rate ratios of the respective branch channels equal to predetermined ratios; and a target pressure setting section adapted to set the target pressure lower as the flow rate through the main channel decreases, and output the target pressure to the valve control section.

According to the present invention configured as described above, even if a total flow rate of introduced fluid is small, a target pressure is changed and set lower depending on the small flow rate, and therefore a measured pressure quickly reaches near or not less than the target pressure. As a result, a control stop period of a control valve can be shortened, and even in the case of a small flow rate, control response is improved as compared with the conventional case, and therefore transient performance of branch flow control can be improved.

DESCRIPTION OF THE PREFERRED EMBODIMENTS

Figure 1:
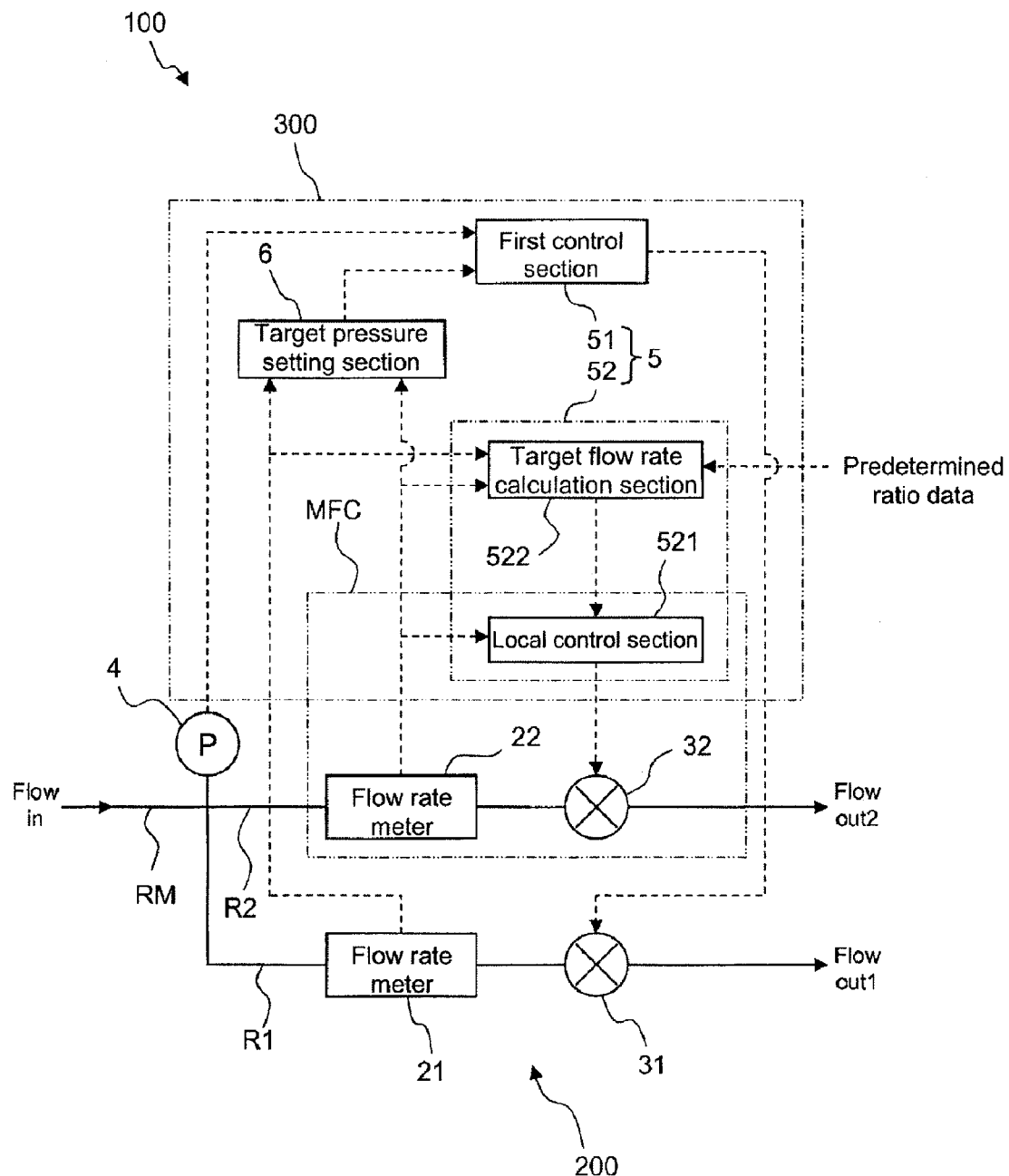
FIG. 1 is a schematic overall view illustrating a flow rate ratio control device in one embodiment of the present invention.

One embodiment of the present invention will hereinafter be described referring to the drawings.

FIG. 1 is a schematic diagram illustrating a flow rate ratio control device 100 according to the present embodiment. The flow rate ratio control device 100 is a device for branching a flow of, for example, source gas for semiconductor manufacturing at a predetermined ratio to supply the gas to a semiconductor processing chamber, and constitutes a part of an unshown semiconductor manufacturing system. The device 100 mainly includes a fluid circuit mechanism 200, and a control mechanism 300 for controlling the fluid circuit mechanism 200.

The fluid circuit mechanism 200 is a mechanism having the same configuration as that of the above-described conventional device, and includes a main channel RM into which fluid to be branched flows, and two branch channels R1 and R2 that branch from an end part of the main channel RM. The fluid to be introduced into the main channel RM is, as described above, for example a source gas mixture for semiconductor manufacturing; however, in the present embodiment, on an upstream side of the main channel RM, an unshown flow rate control device is provided, and the flow rate control device controls a mass flow rate of the fluid to be introduced. Note that the terms "main channel and branch channels" are names given for convenience to distinguish among the channels, and are not intended to indicate a physical shape or nature. That is, a channel section through which flows the whole of the fluid branching into the branch channel flows corresponds to the main channel, and in the case where, for example, there is one large tube, and a small tube branches from a side wall of the large tube, the main channel corresponds to a section before the branch, and the small and large tubes on a downstream side from the branch respectively correspond to the branch channels.

In the branch channels R1 and R2, flow rate meters 21 and 22, which are flow rate measuring means, and control valves 31 and 32 are respectively provided in series.

The flow rate meter 21 (22) is a meter for measuring a mass flow rate of the fluid passing therethrough, and although not illustrated in detail, various types of meters, such as a thermal-type flow rate meter and differential-pressure-type flow rate meter, may be used. Also, in the present embodiment, the flow rate through the main channel RM is indirectly obtained by adding measured flow rates through the respective branch channels R1 and R2; however, for example, the flow rates through the main channel and one of the branch channels may be directly measured, and the flow rate through the other branch channel may be indirectly obtained from the difference between the measured flow rates. In cases where flow rates are obtained indirectly, the control mechanism 300 (to be described later) for the calculation will perform part of the function of the flow rate measuring means.

The control valve 31 (32) is a remotely controllable valve, such as a piezoelectric valve, solenoid valve, thermal valve, or butterfly valve, for enlarging/reducing a channel diameter according to the value of a received valve control signal (to be described later). In the diagram, the control valves 31 and 32 are provided on the downstream sides of the flow rate meters 21 and 22, respectively; however, depending on the type of the flow rate meter, the flow rate meters 21 and 22 may be provided on downstream sides of the control valves 31 and 32, respectively. Reference symbol 4 represents a pressure sensor 4 for measuring pressure inside the main channel RM to output a pressure measurement signal indicating a value of the pressure. In the present embodiment, the pressure sensor 4 is arranged at the branch point located at the end of the main channel RM, but may be provided at a site communicatively connected to the branch point without a pressure drop, for example, on the upstream end of the flow rate meter 21 or 22 in the branch channel R1 or R2, or at an intermediate site in the main channel RM; the position where the pressure sensor 4 is disposed may be, for example, a site where, in short, the pressure inside the main channel can be measured, even with a pressure drop.

The control mechanism 300 is an analog circuit, a digital circuit using a CPU, or an electrical circuit in which analog and digital circuits are mixed, and based on operation of the electrical circuit, a valve control section 5 fulfills functions including functioning as a target pressure setting section 6.

Each section is now described. The valve control section 5 is a section for outputting the above-described valve control signal to each of the control valves 31 and 32 to control the degree of valve opening, and includes a first control section 51 and a second control section 52.

The first control section 51, which is a section for controlling the control valve 31 provided in one of the branch channels R1, performs a feedback calculation on the basis of the difference between the value of the pressure measurement data (also hereinafter referred to as the measured pressure) outputted from the pressure sensor 4, and a separately given target pressure, to calculate the value of the valve control signal such that the value of the pressure measurement data becomes equal to the target pressure, and outputs the valve control signal.

Meanwhile, if the target pressure is low, and correspondingly, the measured pressure is also low, on account of the low pressure the valve 31 does not function readily to begin with, and further if the value of the valve control signal is small, the operation may become unstable due to a dead band of the valve 31. For this reason, the present embodiment employs control in which a value of a feedback gain is increased as the target pressure decreases, such that even if the target pressure is low, stable control can be quickly performed, and after the stable control of the pressure, subsequent flow rate control is quickly started. More specifically, the value of the feedback gain is determined on the basis of the following Formula (1):

$$f(s) = (100 + K1)/(K1 + s) \quad \text{(Formula 1)}$$

Here, f(s) represents the feedback gain, s represents the target pressure, and K1 represents an adjustment factor that is appropriately set. In addition, regarding where the f(s) calculation is applied, the present embodiment is adapted so as to multiply a value, calculated by carrying out a PID computation on the deviation of the measured pressure from the target pressure, by f(s) to calculate the valve control value. Alternatively, depending on the control system, the above-mentioned deviation may be multiplied by f(s) to calculate the valve control value, or a PID computation may be carried out on a value, calculated by multiplying the deviation by f(s), to calculate the valve control value.

The second control section 52, which is a section for controlling the control valve 32 provided in the other branch channel R2, performs a feedback calculation to calculate the value of the valve control signal such that a flow rate ratio of the measured flow rate through the branch channel R2 becomes equal to a value of predetermined ratio data (also hereinafter referred to as a predetermined ratio) transmitted from an external computer or the like, and outputs the valve control signal. However, in the case where the above-described measured pressure does not exceed a vicinity of the target pressure, i.e., in the case where the above-described measured pressure does not exceed a pressure lower than the target pressure by a predetermined value, a valve close signal, i.e., a signal for completely closing the valve, is outputted, and the value subjected to the feedback calculation is not used. Note that the flow ratio refers to a ratio of a flow rate through each of the branch channels R1 and R2 to the total flow rate, i.e., the flow rate through the main channel RM.

Herein, regarding the above-described function of the valve control section 5, only a framework in terms of principles has been described, and even where the function is the same case, differences in physical configuration, and differences in the calculation process based thereon in practice will occur to some extent.

For example, in the present embodiment, the second control section 52 includes a target flow rate calculation section 522 and a local control section 521, and the local control section 521 is a component of a mass flow controller MFC provided in the other branch channel R2. The mass flow controller MFC includes the above-described control valve 32, the flow rate meter 22, and the local control section 521, and the above-described local control section 521 is adapted to calculate the value of the valve control signal on the basis of the difference between the measured flow rate measured by the flow rate meter 22, and the externally given target flow rate so as to meet the target flow rate, and then control the control valve 32.

We here describe what kind of calculation is performed under such a configuration. First, by the above-described target flow rate calculation section 522 that is provided physically separately from the mass flow controller MFC, the target flow rate that makes the flow rate ratio in the other branch channel R2 equal to the above-described predetermined ratio is calculated and outputted to the mass flow controller MFC. Note that the predetermined ratio here refers to a ratio of a flow rate flowed into the mass flow controller MFC to the total mass flow rate. Then, to control the control valve 32, the mass flow controller MFC calculates the value of the valve control signal on the basis of the difference between the measured flow rate and the target flow rate.

Note that the calculation of the target flow rate by the target flow rate calculation section 522 is performed, for example, as follows.

First, the measured flow rates Qmfrn and Qmfc from the respective flow rate meters 21 and 22 are added to obtain the total mass flow rate Q of the fluid flowing through the main channel RM (see Formula 2).

$$Q = Qmfm + Qmfc \quad \text{(Formula 2)}$$

Then, the target flow rate Qmfc_SET is calculated from the predetermined ratio RATIO_SET on the basis of the following (Formula 3):

$$\text{Qmfc\_SET} = Q \times \text{RATIO\_SET} \quad \text{(Formula 3)}$$

$$= \frac{Qmfm \times \text{RATIO\_SET}}{(1 - \text{RATIO\_SET})}$$

Figure 2:
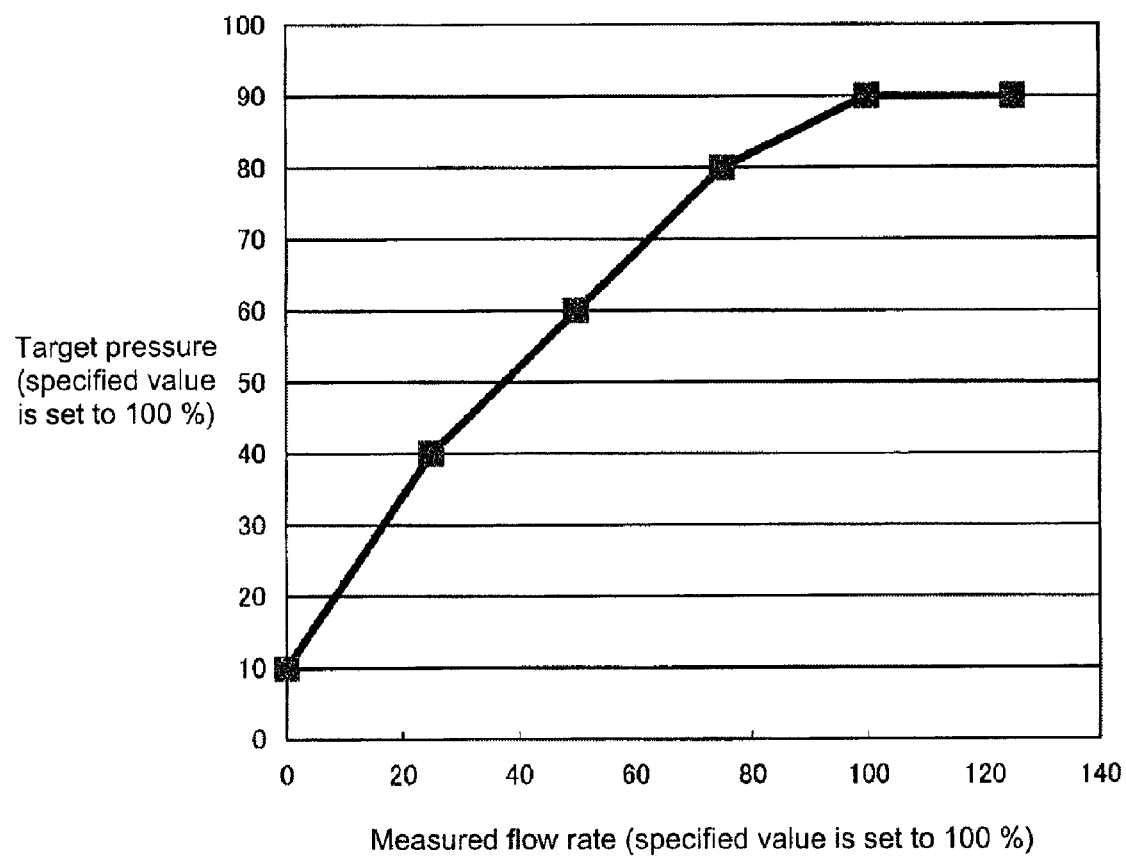
FIG. 2 is a graph illustrating a relationship between a measured flow rate and a target pressure corresponding to the flow rate in the same embodiment.
Figure 3:
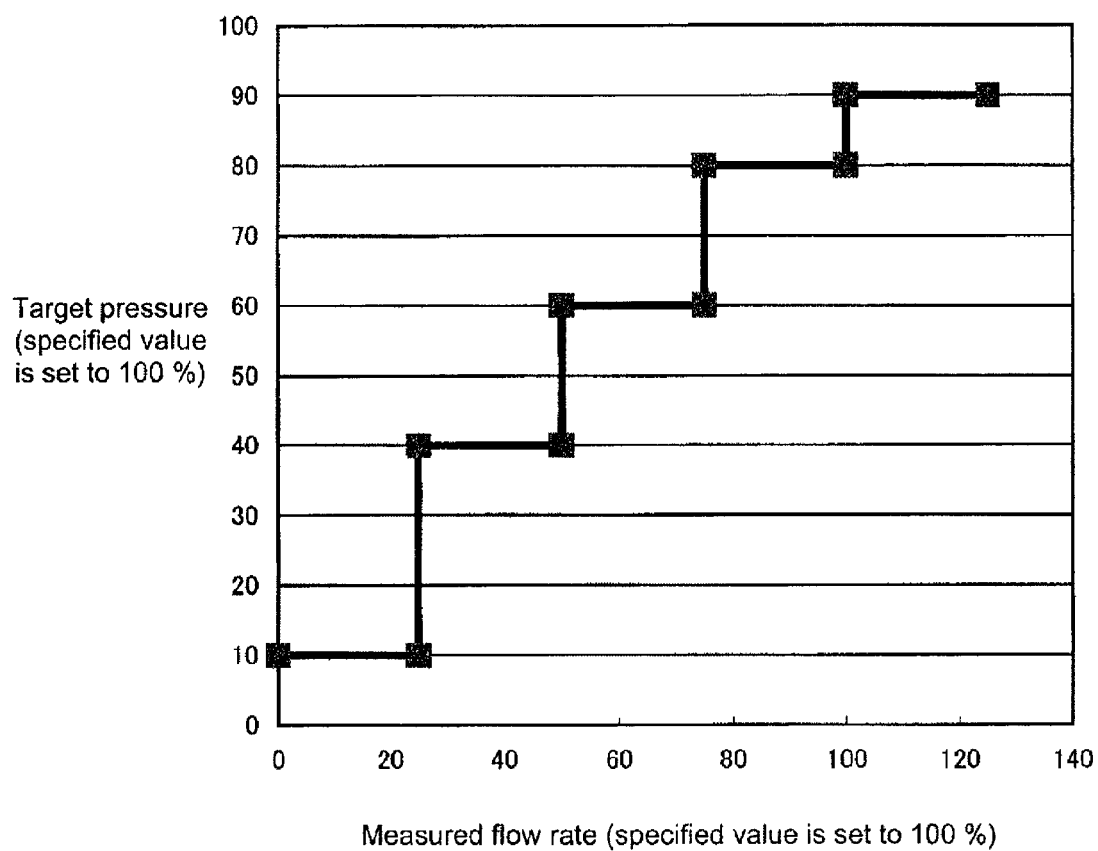
FIG. 3 is a modification of the same embodiment, and is a graph illustrating a relationship between a measured flow rate and a target pressure corresponding to the flow rate.

On the other hand, the above-described target pressure setting section 6 sets the above-described target pressure lower as the measured flow rate through the main channel RM decreases, and outputs the target pressure to the above-described valve control section 5. The relationship between the measured flow rate and the corresponding target pressure may be configured such that, for example, as illustrated in FIG. 2, the target pressure is inevitably changed in response to a change in measured flow rate, or, as illustrated in FIG. 3, so that the target pressure is changed stepwise in response of the change in measured flow rate. Note that the target pressure at the measured flow rate of 0 is not 0, but set to have a slightly positive value by offsetting. This is intended to prevent initial operation of the valves from being delayed due to the dead band and hysteresis inherent in the valves. In addition, in the present embodiment, the above-described offset pressure is set to the same as or more than a minimum required pressure for flowing a minimum operating flow rate of the flow rate ratio control device 100. The minimum operating flow rate of the flow rate ratio control device 100 is determined by a minimum flow rate control value of the mass flow controller MFC and a minimum flow rate ratio control value of the flow rate ratio control device 100. For example, if a minimum flow rate control value of the mass flow controller MFC is 2%, and a minimum flow rate ratio control value of the flow rate ratio control device 100 is 10%, 20% of a full-scale flow rate of the mass flow controller MFC (2% × 100/10) will be the minimum operating flow rate of the flow rate ratio control device 100.

Figure 4:
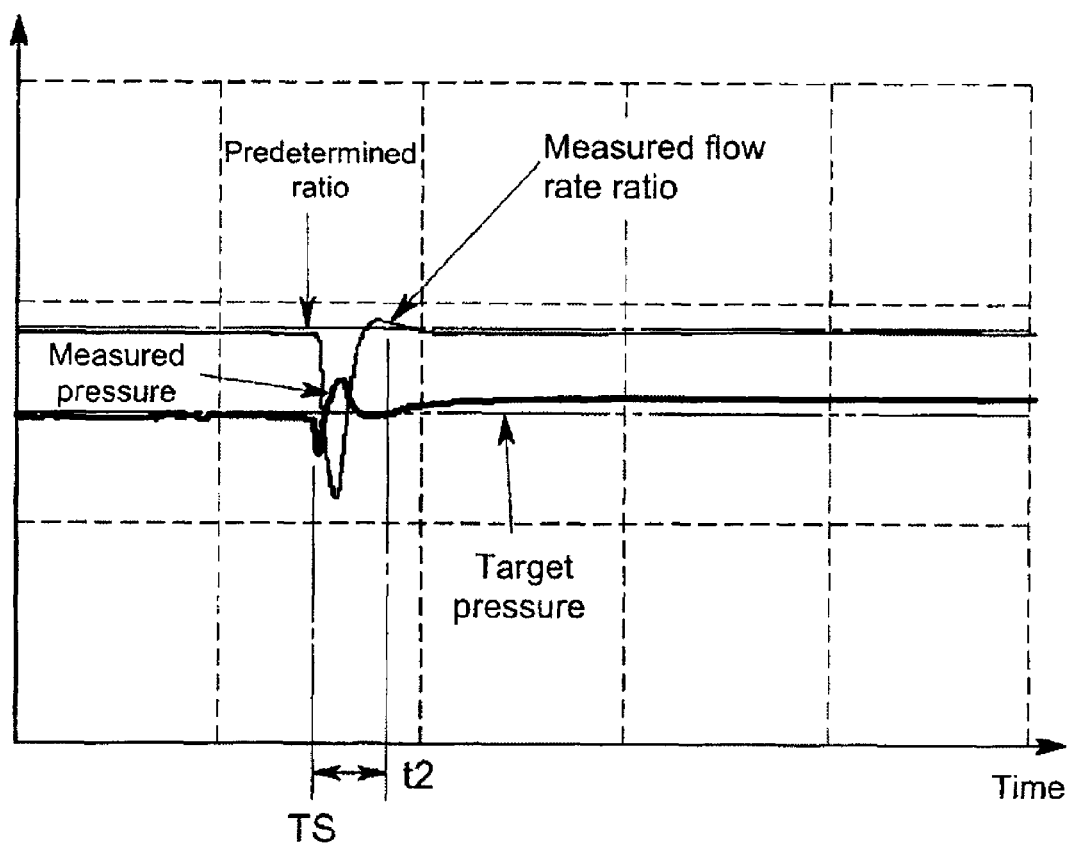
FIG. 4 is an experimental result illustrating response characteristics in the same embodiment.
Figure 5:
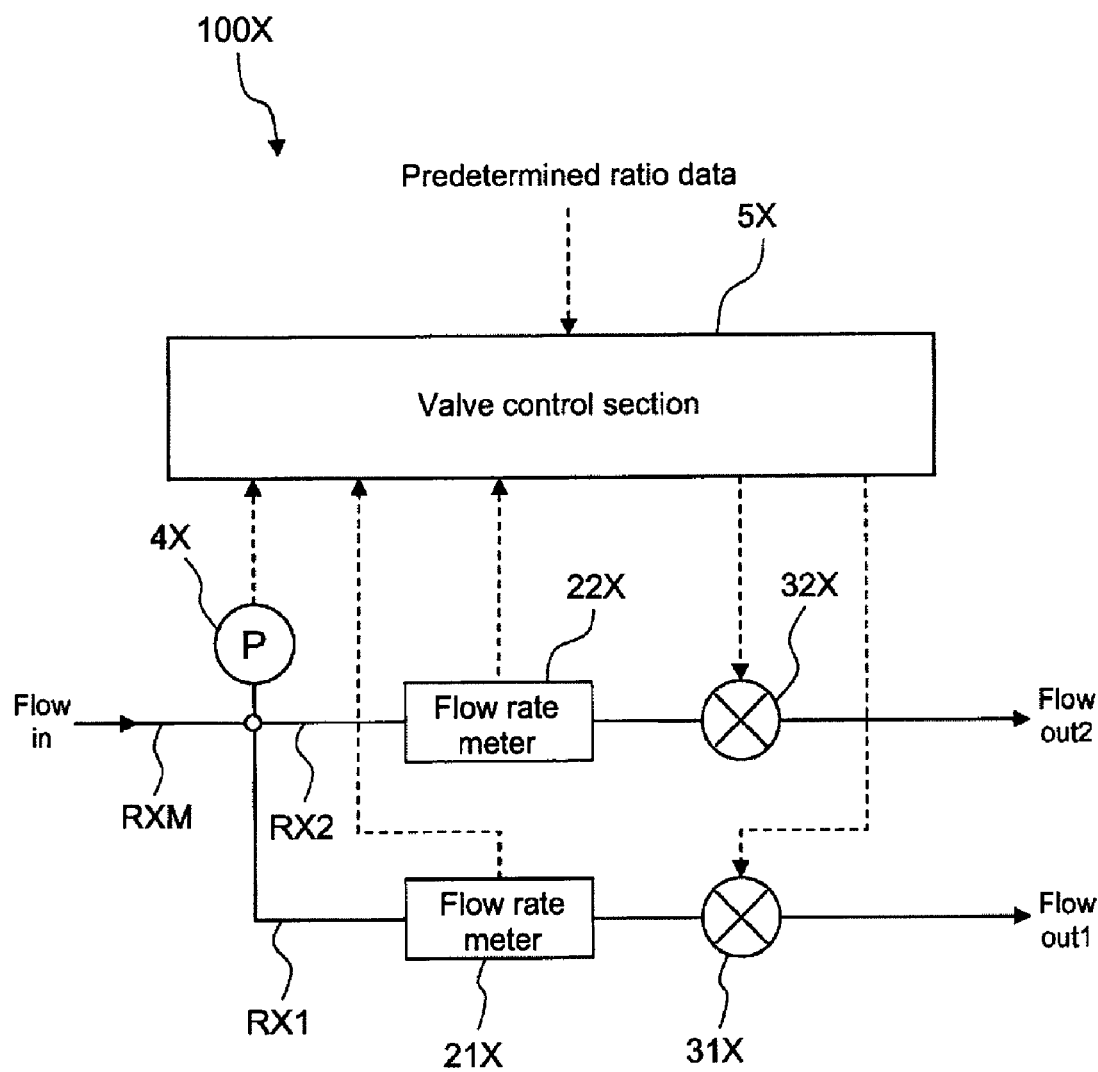
FIG. 5 is a schematic overall view illustrating a conventional flow rate ratio control device.
Figure 6:
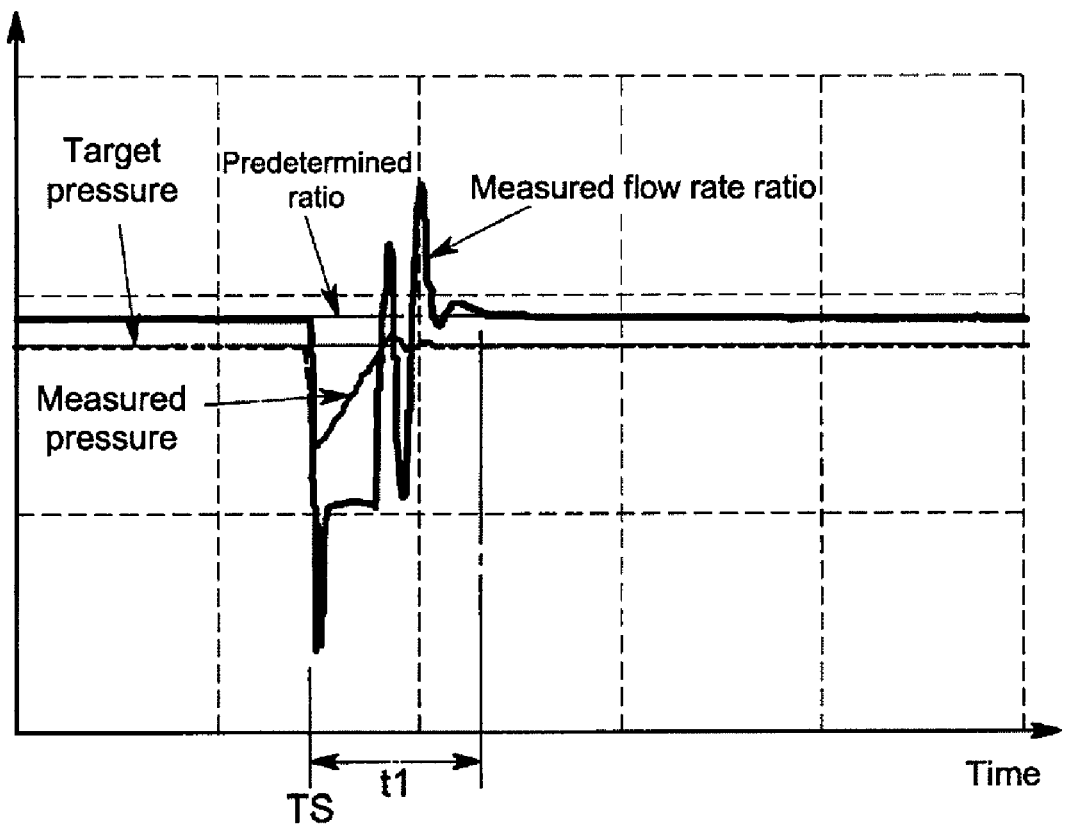
FIG. 6 is an experimental result illustrating conventional response characteristics.

A specific experimental result is illustrated in FIG. 4. As compared with the conventional result illustrated in FIG. 6, it turns out that the target pressure is set lower, and the response is significantly improved.

Thus, according to the present embodiment, even if the total flow rate of the introduced fluid is small, the target pressure is changed and set lower correspondingly to the small flow rate, and therefore a control condition for the control valves 31 and 32, i.e., "the measured pressure is near or not less than the target pressure," is met in a short period of time, and a dead time during which the respective control valves 31 and 32 are not controlled can be shortened. As a result, at a small flow rate, the control response is improved as compared with the conventional case, and therefore the transient performance of branch flow control can be improved.

Also, the present invention can be realized simply by changing a software configuration in an existing device, and therefore a significant increase in cost or equipment investment is not required.

Note that the present invention is not limited to the above-described embodiment. For example, three or more branch channels may be provided. However, in terms of control, it is desirable to use one of them as a pressure control line for controlling a degree of control valve opening with use of a pressure as a parameter, and the other branch channels as flow rate control lines for controlling flow rates so as to achieve desired branch flow ratios.

Also, in the above-described embodiment, the measured flow rate is used in real time to determine the target pressure; however, without limitation to this, for the purpose of control stability or the like, a time delay may be provided, or the target pressure may be determined on the basis of the measured flow rate at the time when some condition is met.

Further, the above-described control mechanism is not required to be physically independent, but a function thereof may be attached to, for example, the other control device, information processor, or the like related to semiconductor manufacturing. Specifically, for example, a computer used for the other purpose is loaded with software for embodying the control mechanism.

Also, the present invention can be applied not only to a semiconductor manufacturing process but to the other gases, and may be applied to liquids in addition to gases, to produce the same working effect as that of the above-described embodiment.

In addition, the present invention can be variously modified without departing from the scope thereof.

What is claimed is:

1. A flow rate ratio control device comprising:
    a main channel into which fluid flows;
    a plurality of branch channels branching from an end part of the main channel;
    control valves respectively provided in the branch channels;
    flow rate meters adapted to directly or indirectly measure a flow rate through the main channel and flow rates through the respective branch channels;
    a pressure sensor adapted to measure a pressure on an upstream side of one of the control valves provided in one of the branch channels;
    a valve control section adapted to control one of the control valves provided in one of the branch channels so as to make a pressure on the upstream side of the control valve equal to a given target pressure, and upon the pressure exceeding a pressure lower than the target pressure by a predetermined value, start to control other of the control valves so as to make flow rate ratios of the respective branch channels equal to predetermined ratios; and
    a target pressure setting section adapted to set the target pressure lower as the flow rate through the main channel decreases, and output the target pressure to the valve control section.

2. The flow rate ratio control device according to claim 1, wherein the number of the branch channels is two.

3. A control mechanism applied to a fluid circuit mechanism comprising a main channel into which fluid flows, a plurality of branch channels branching from an end part of the main channel, control valves respectively provided in the branch channels, flow rate meters adapted to directly or indirectly measure a flow rate through the main channel and flow rates through the respective branch channels, and a pressure sensor adapted to measure a pressure on an upstream side of one of the control valves in one of the branch channels, the control mechanism comprising:
    a valve control section adapted to control the control valve provided in the one branch channel, to make a pressure on the upstream side of the control valve equal to a given target pressure, and upon the pressure exceeding a pressure lower than the target pressure by a predetermined value, start to control other of the control valves so as to make flow rate ratios of the respective branch channels equal to predetermined ratios; and
    a target pressure setting section adapted to set the target pressure lower as the flow rate through the main channel decreases, and output the target pressure to the valve control section.

* * * * *